Nov. 16, 1943.   T. E. SULLIVAN   2,334,515
GEAR
Filed Dec. 4, 1942   3 Sheets-Sheet 1
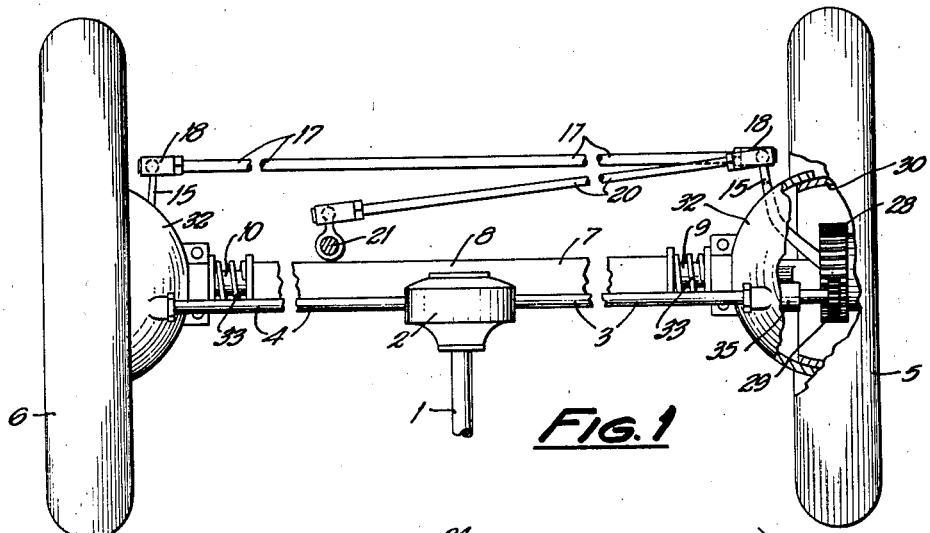
Fig. 1
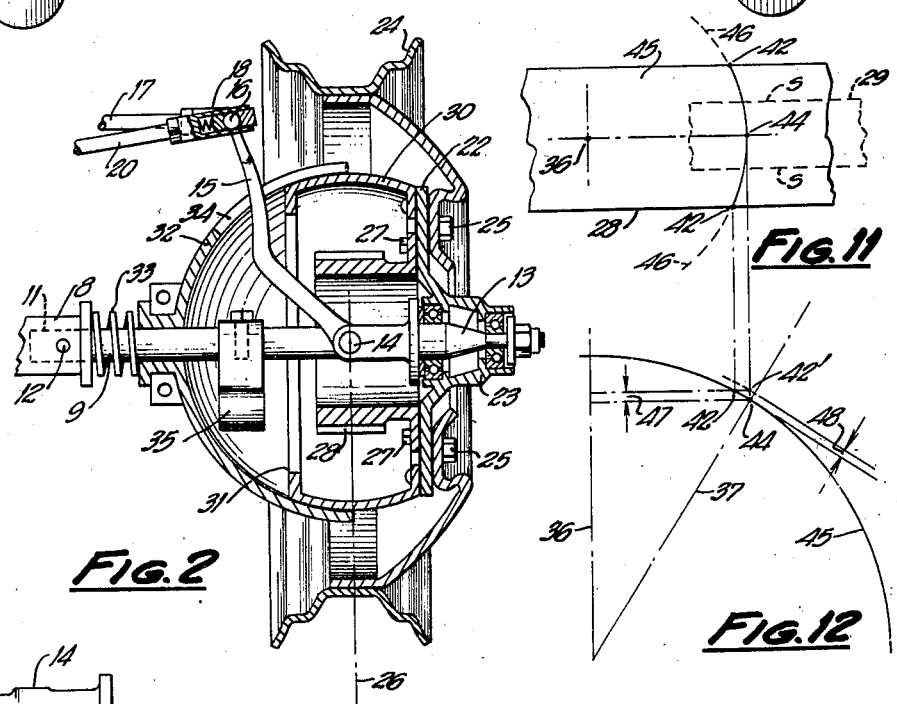
Fig. 2
Fig. 11
Fig. 12
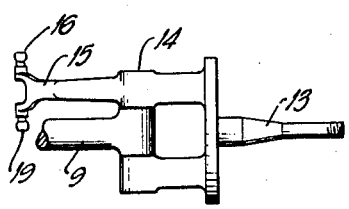
Fig. 3
INVENTOR
Thomas E. Sullivan
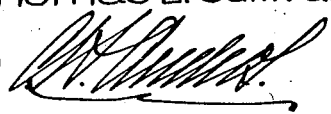
ATTORNEY Nov. 16, 1943.   T. E. SULLIVAN   2,334,515
GEAR
Filed Dec. 4, 1942   3 Sheets-Sheet 2

INVENTOR
Thomas E. Sullivan
by
ATTORNEY

Nov. 16, 1943.        T. E. SULLIVAN            2,334,515
                         GEAR
              Filed Dec. 4, 1942         3 Sheets-Sheet 3
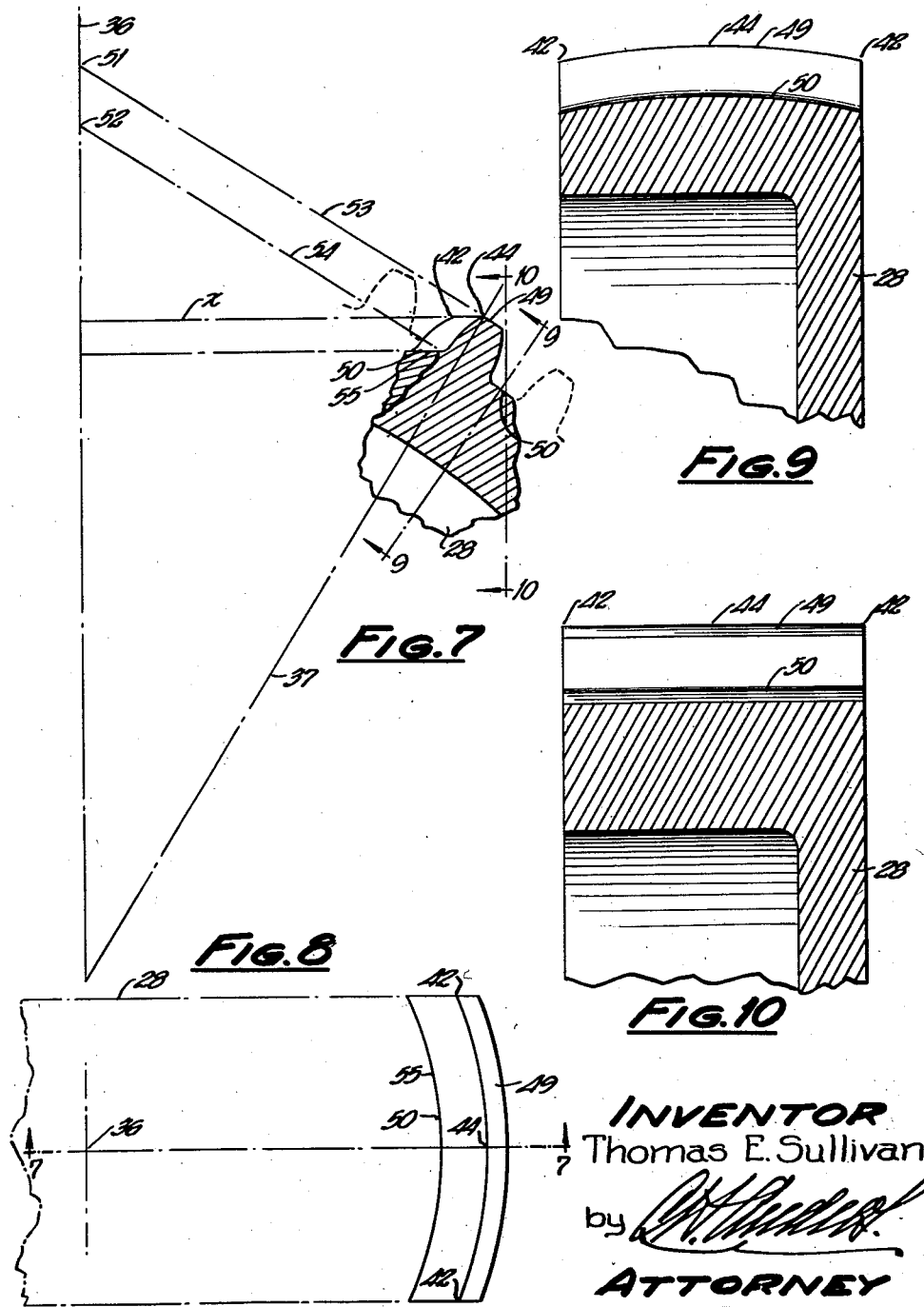
INVENTOR
Thomas E. Sullivan
by
ATTORNEY Patented Nov. 16, 1943

2,334,515

UNITED STATES PATENT OFFICE 2,334,515

GEAR

Thomas E. Sullivan, North Lawrence, N. Y., assignor of one-half to Giles A. Chase, Massena, N. Y.

Application December 4, 1942, Serial No. 467,855

15 Claims. (Cl. 74—384)

My invention relates to gears and particularly to a combination of two meshing gears one of which rotates about a fixed axis and the other of which rotates about a movable axis. Gears of this general type may be used to transmit motion to the front wheels of a motor vehicle which must rotate about a movable axis, in order to effect steering, and are applicable to industrial and other uses where gearing of this type is desirable.

It has heretofore been suggested that the front wheels of a motor vehicle might be driven by gears capable of operating in this way but such gears have been either impracticable or impossible to construct and, so far as I am aware, such suggestions have never been carried any further than the paper stage.

The principal object of my invention is to provide a pair of meshed spur gears of such design that it will be practical to cut or otherwise form them, and in which one of the gears rotates about an axis having a limited degree of angular movement in a plane perpendicular to the general plane of the gear. Another object is to provide a mounting for the axis of one of said gears whereby said axis may be rotated to a limited degree in either direction from a position in which it is parallel to the axis of the other gear to positions in which it is angularly disposed thereto.

For purposes of illustration only, I shall describe my invention as applied to a front wheel drive for a motor vehicle but it is to be understood that the gears are of general application.

Referring to the drawings—

Fig. 1 is a fragmentary plan view, with parts broken away, of a front wheel drive for a motor vehicle;

Fig. 2 is a sectional view of one wheel taken in a horizontal plane approximately through its axis of rotation;

Fig. 3 is a fragmentary elevation view of the front axle of a motor vehicle showing the wheel spindle assembled therewith;

Fig. 7 is a fragmentary, diagrammatic, sectional elevation view of the larger gear with a tooth of modified design thereon;

Fig. 8 is a top plan view of Fig. 7;

Fig. 9 is a fragmentary section of Fig. 7 in the plane 9—9;

Fig. 10 is a fragmentary section of Fig. 7 in the plane 10—10;

Fig. 11 is a diagrammatic plan view of the intersection of the two cylinders illustrating the outline of one edge of a tooth on the larger gear; and Fig. 12 is an elevation view of Fig. 11.

Figure 4:
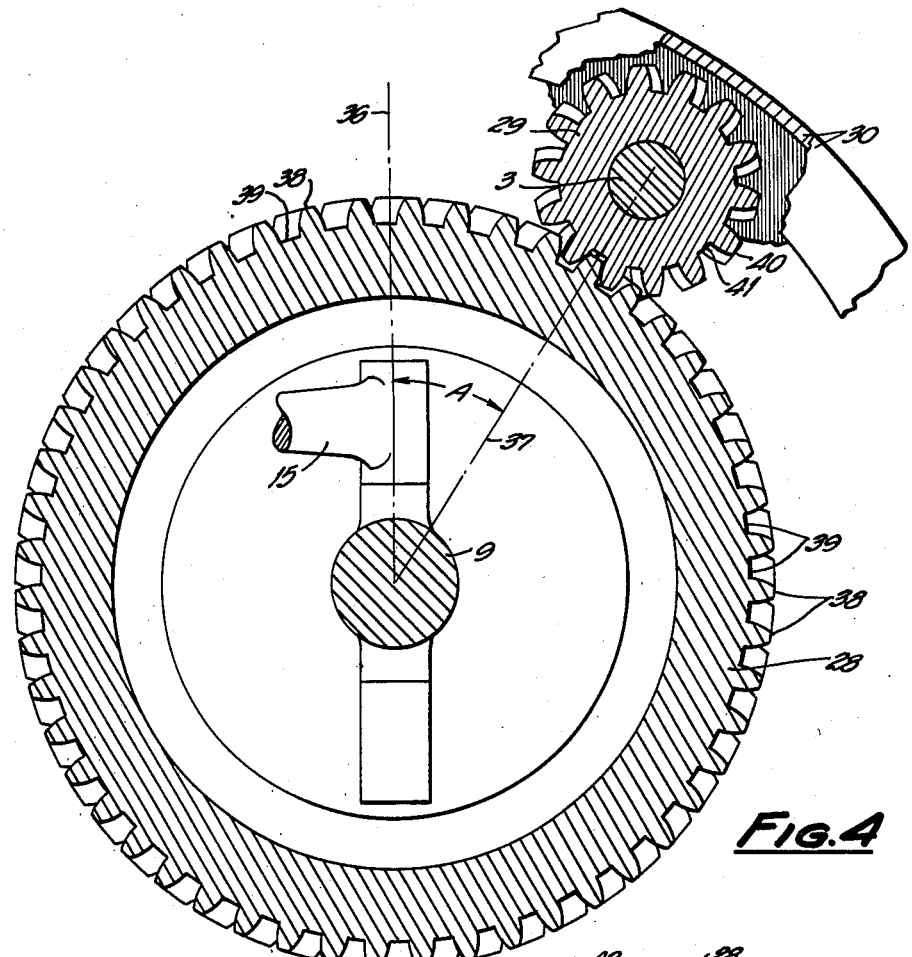
Fig. 4 is a fragmentary, sectional elevation view through a pair of gears.

Referring to the drawings, 1 is the drive shaft housing of a motor vehicle which is connected to the differential housing 2 containing the usual gears (not shown), and 3 and 4 are the drive shafts which extend from the differential to each of the front wheels 5 and 6. 7 is the front axle which may comprise a center member 8, and two end members 9 and 10 which are preferably circular in cross section. The end members may be threaded into the ends of the center section 8, as shown at 11, and secured therein by means of pins 12. 13 is the wheel spindle which is pivotally secured to the ends of the axles by means of the usual king pins 14. For purposes of illustration only the axes of the king pins are shown as vertical although in practice they are usually given a slight tilt towards the rear of the vehicle to facilitate steering. Integral with or connected to the wheel spindles are the arms 15 by which the vehicle is steered. At the free ends, these arms are provided with balls 19 (see Fig. 3) to which the distance rod 17 is connected by means of socket members 18, and at least one of the arms 15 is provided with a second ball 16 to which the drag link 20 is connected. The other end of the drag link 20 is connected to the steering column 21.

Mounted on the wheel spindle with the usual bearings is the circular plate 22 radiating from the hub 23. The wheel, comprising the tire rim 24, is secured to the plate 22 in the usual way by means of cap screws or stud bolts 25 so that it is readily demountable. The central plane 26 of the wheel preferably passes through the axis of the king pin, as shown in Fig. 2.

Secured to the opposite side of the plate 22 by means of bolts 27, or otherwise, is the driven gear 28, the central plane of which also passes through the axis of the king pin. At the ends of the driving shafts 3 and 4 are the driving gears 29, only one of which is shown, and which mesh with the driven gears 28.

Preferably surrounding the meshing gears is a spherical housing 30 which is secured to the plate 22 and which is provided on the inner or open side with an in-turned peripheral flange 31. Engaging the exterior of the spherical housing 30 is the outer hemispherical housing 32 which is held in contact with the housing 30 by means of the compression springs 33. The arms 15 pass through slotted openings 34 in the hemispherical housing and the drive shafts 3 and 4 also pass through this housing and are supported at the inner ends adjacent the driving gears in bearings 25 secured to the end members of the axles 9. Lubricant for the gears will be retained in the bottom of the housing 30 when the vehicle is stationary by means of the flange 31. When the wheel is turning rapidly the lubricant, due to centrifugal force, will be thrown into the form of an annulus around the inside of housing 30 where it will be intercepted by the teeth of gear 29 which just clear the inside of housing 30 as shown in Fig. 4.

It will be apparent from the foregoing that the driven gear 28 which is secured to the wheel rotates about the axis of the spindle 13 but may also be turned about the axis of the king pin as the wheel is turned to steer the vehicle.

Figure 5:
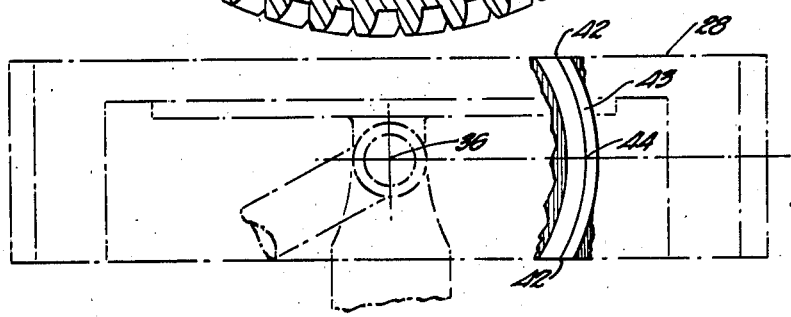
Fig. 5 is a fragmentary plan view of the larger or driven gear showing one tooth thereon.
Figure 6:
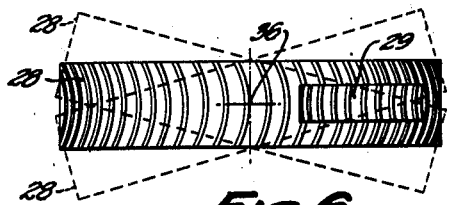
Fig. 6 is a plan view to a smaller scale of the two gears.

Referring to Figs. 4, 5 and 6, it will be noted that the angle A between the axis 36 of the king pin and the line 37 passing through the centers of the gears, as shown, is slightly less than 30°, and, within reasonable limits, this angle is of considerable importance from a practical standpoint. It would be impracticable to make the line joining the centers of the gears coincident with the axis of the king pin and equally impracticable to make the angle A as great as 90°. With the angle A as great as 90°, it would be impossible to provide any substantial angular movement of the larger gear about the axis of the king pin due to the impracticable width of gear required. On the other hand, if the line joining the centers of the gears were coincident with the axis of the king pin the shape of the gear teeth and the relative face widths of the gears would be quite impracticable. It is desirable that the full width of the teeth on the driving pinion be utilized at all times in order properly to transmit the load to the driven gear. In other words, the turning movement of the driven gear about the axis of the king pin ought not to be so great as to disengage any substantial part of the driving gear therewith. Thus, the load to be transmitted will determine the width of the pinion and, in order to provide the necessary angular movement, in either direction, of the driven gear about the axis of the king pin, the face of this gear must be wider than that of the pinion gear. These factors being known, it is possible, by providing proper clearances between the teeth of the gears and for backlash, so to position the pinion with respect to the axis of the king pin that both the addendum and root surfaces of the gears may be made cylindrical and yet work well together.

Referring to Figs. 4 and 5, it will be apparent that every point on the teeth of the driven gear will, in plan view, describe a circle about a center on the axis of the king pin. The path described by most of the points on the teeth of the driven gear are of no moment because only certain of the teeth are in mesh with those of the pinion and it is only these last mentioned teeth which are of importance and which determine the shape of all of the teeth. Thus, in the type of gears shown in Figs. 4, 5 and 6 the addendum surfaces 38 and the root surfaces 39 of the larger gear lie on concentric cylinders, as do the corresponding surfaces 40 and 41 of the smaller gear. In other words, the peripheries of the gears are cylindrical. This being so, it will be apparent that the points 42 (see Fig. 5) on the tooth 43 are at a higher elevation than the point 44. When the large gear is turned about the axis 36 of the king pin in either direction the points 42 describe, in plan view, a circle passing through the points 42 and 44, and which lies in a plane perpendicular to the axis 36. In space, however, this circle does not pass through the point which was occupied by the point 44 when the axes of the gears were parallel but passes above this point a distance equal to the difference in elevation between points 42 and 44.

This will be clear by reference to Figs. 11 and 12 in which 45 in Fig. 11 is a fragmentary top plan view of the cylindrical outer surface of the larger gear which is represented in elevation, in Fig. 12, by the arc 45. The points 42 and 44 are indicated in these figures, and the arc 46 in Fig. 11 having its center at 36 indicates the top plan view of a vertical cylinder intersecting the cylindrical surface of the larger gear, in plan, in the arc 42—44—42. Since the points 42 and 44 lie on the arc 45 it will be noted that the point 42 is higher than the point 44 by the distance 47. Hence, if the large gear is rotated about the axis of the king pin until either of the points 42 is coincident in plan view with the position formerly occupied by point 44, the point 42 will then be at point 42', and additional clearance at least equal to the distance 43 must be provided between the gears. In practice, this clearance is not as great as indicated because the angular movement of the larger gear should be limited so that the points 42 cannot pass beyond the sides of the small gear indicated by the lines S in Fig. 11. In any event this additional clearance is not excessive and may be eliminated, if desired, by a slight modification in the shape of the tooth.

Thus, it will be apparent by reference to Figs. 7 to 10, inclusive, that it is possible so to design the gears that the points 42 will be at the same elevation as the point 44 (the same numerals being used in these figures as in the other figures in order to avoid confusion). Fig. 7 is a fragmentary sectional elevation view through the center of the larger gear, or in the plane 7—7 of Fig. 8 which is a fragmentary plan view of the larger gear showing one tooth thereon; the tooth approximately coincident with the line 37 joining the centers of the gears. By making the addendum surface 49 of each tooth and the root surfaces 50 portions of conical surfaces having their vertices at 51 and approximately 52, respectively, on the axis 36 and generated by the lines 53 and 54, respectively, which are tangent to the addendum and root circles of the larger gear at their points of intersection with the line 37 joining the centers of the gears.

It will be apparent in this case that the line 42—44—42 in Fig. 8, half of which is shown as the line 42—44 in Fig. 7, and which represents one edge of the tooth, is a true circle lying in a horizontal plane and is the section of the cone generated by the line 53 moving about the axis 36 which is cut by the horizontal plane X. Similarly the line of intersection 55 of the flank of the tooth shown and the root surface 50 is a true circle.

In the type of gear shown in Figs. 4 and 5 the edge 42—44—42 of the tooth is not a circle but the line of intersection of two cylinders which a line of double curvature.

Thus, in the type of gear shown in Figs. 7 to 11 the point 42 may move into and occupy exactly the same position in space as the point 44, when the larger gear is swung about the axis of the king pin, and hence clearance, in addition to the normal clearance which would be provided, is not necessary. Furthermore, the side surfaces of the teeth comprising the face and flank are surfaces of revolution generated by rotating the tooth profile about the axis 36.

In the type of gear illustrated in Figs. 4 and 5, it will be apparent that the difference in elevation between the points 42 and the point 44 on any tooth decreases as the teeth approach the top of the gear. Hence the clearance, in excess of normal clearance which must be provided decreases as the angle A decreases. With gears of given width, the extent to which the larger gear may be swung about the axis of the king pin, and still maintain the teeth on the smaller gear in mesh throughout the width of the gear, increases as the angle A decreases.

Another factor which must be considered in connection with the fixing of the angle A is the curvature of the teeth elements in mesh which is a function of their distance from the axis of the king pin and is also limited by the face width of the larger gear. In practice, the face width of the larger gear ought not substantially to exceed the distance between the axis of the king pin and the point of tangency of the pitch circles of the gears.

As a practical example of my invention, model gears of the type shown in Figs. 4 and 5 having pitch diameters of about 8½" for the larger gear and about 2¾" for the smaller gear with face widths of 2" and 1", respectively, and in which the distance between the axis of the king pin and the point of tangency of the pitch circles is 2", work very well, and permit a swinging movement of the larger gear of about 15° in either direction. In this case the angle A is approximately 28°. The larger gear has 56 teeth and the smaller 19.

From the foregoing it will be apparent that, in the case of the front wheel drive which I have used to illustrate one practical application of my invention, the axis of the wheel spindle is also the axis of the larger gear, and that this axis may be swung about the axis 36 of the king pin which constitutes a pivotal bearing for the mounting of the larger gear. It will also be noted that the axis of the king pin is coincident with a diameter of the larger gear in the central plane thereof.

What I claim is:

1. In a pair of spur gears, the combination with a first gear of a mounting therefor providing a fixed axis of rotation for said gear, a second gear in mesh with said first gear, a mounting for said second gear providing an axis of rotation therefor, and a pivotal bearing for said second gear mounting having its axis perpendicular to and intersecting the axis of said second gear and lying substantially in the central plane of said second gear.

2. In a pair of spur gears, the combination with a first gear of a mounting therefor providing a fixed axis of rotation for said gear, of a second gear in mesh with said first gear, a pivotal mounting for said second gear providing an axis of rotation therefor and also a second axis about which said gear and its axis of rotation may be rotated; said second axis being substantially coincident with a diameter of said second gear in the central plane thereof.

3. A pair of meshed spur gears comprising a first gear having a fixed axis of rotation and a second gear having a fixed center and an axis of rotation normally parallel to the axis of the first gear, and a pivotal mounting for said second gear having its axis passing through the fixed center of said second gear.

4. A spur gear having the addendum surfaces of the teeth and the root surfaces, comprising portions of coaxial conical surfaces and having the side surfaces of said teeth conforming substantially to surfaces of revolution formed by revolving the tooth profiles about the common axis of said conical surfaces.

5. A spur gear having the addendum surfaces of the teeth and the root surfaces comprising portions of conical surfaces having a common axis coincident with a diameter of said gear in the central plane thereof and having the side surfaces of said teeth conforming substantially to surfaces of revolution formed by revolving the tooth profiles about the common axis of said conical surfaces.

6. A pair of meshed spur gears comprising a first gear, a mounting therefor providing a fixed axis of rotation for said gear, a second gear, a mounting for said second gear providing an axis of rotation therefor and a pivotal bearing for said second gear mounting having its axis coincident with a diameter of said second gear in the central plane thereof; the cooperating surfaces of the teeth on both gears when substantially at the pitch point conforming substantially to surfaces of revolution formed by revolving the respective tooth profiles thereof about the axis of said pivotal bearing.

7. A front wheel drive for a motor vehicle comprising a wheel, a spindle on which said wheel is mounted, a spur gear secured to said wheel, a pivotal mounting for said spindle having its axis substantially coincident with a diameter of said spur gear in the central plane thereof, a driving spur gear in mesh with said first mentioned gear and a bearing for said driving gear providing a fixed axis of rotation therefor.

8. A pair of meshed spur gears comprising a first gear, a mounting therefor providing a fixed axis of rotation for said gear, a second gear, a mounting for said second gear providing an axis of rotation therefor, and a pivotal bearing for said second gear mounting having its axis substantially coincident with a diameter of said second gear in the central plane thereof; the width of face of said first gear being substantially less than the width of face of said second gear and the cooperating tooth surfaces of both gears at the pitch line conforming substantially to surfaces of revolution having their axes substantially coincident with the axis of said pivotal bearing; whereby said second gear may be turned about the axis of said pivotal bearing to a substantial degree while maintaining the teeth of said first gear in mesh therewith throughout the width of face of said first gear.

9. A pair of meshed spur gears comprising a first gear, a mounting therefor providing a fixed axis of rotation for said gear, a second gear, a mounting for said second gear providing an axis of rotation therefor, and a pivotal bearing for said second gear mounting having its axis substantially coincident with a diameter of said second gear in the central plane thereof; the addendum and root surfaces of said gears lying in cylindrical surfaces coaxial with their respective axes and substantially throughout the width of said gears, and the side surfaces of the teeth of said gears when at the pitch point conforming approximately to surfaces of revolution formed by revolving the tooth profiles about the axis of said pivotal bearing.

10. The structure set forth in claim 8 in which the width of face of said second gear is about twice that of said first gear.

11. A pair of meshed spur gears comprising a first gear, a mounting therefor providing a fixed axis of rotation for said gear, a second gear, a mounting for said second gear providing an axis of rotation therefor, and a pivotal bearing for said second gear mounting having its axis substantially coincident with a diameter of said second gear in the central plane thereof; the addendum and root surfaces of said gears conforming substantially to conical surfaces generated by revolving lines tangent to the addendum and root circles, respectively, of said gears about their points of intersection with the axis of said pivotal bearing.

12. A pair of meshed spur gears comprising a first gear, a mounting therefor providing a fixed axis of rotation for said gear, a second gear, a mounting for said second gear providing an axis of rotation therefor, and a pivotal bearing for said second gear mounting having its axis substantially coincident with a diameter of said second gear in the central plane thereof; the addendum and root surfaces of said gears conforming substantially to conical surfaces generated by revolving lines tangent to the addendum and root circles, respectively, of said gears about their points of intersection with the axis of said pivotal bearing, and the side surfaces of the teeth of said gears conforming approximately to surfaces of revolution generated by revolving their respective tooth profiles passing through the pitch point about the axis of said pivotal bearing.

13. A front wheel drive for a motor vehicle comprising the structure set forth in claim 8.

14. A front wheel drive for a motor vehicle comprising the structure set forth in claim 11.

15. A front wheel drive for a motor vehicle comprising the structure set forth in claim 12.

THOMAS E. SULLIVAN.